United States Patent Office 3,513,216
Patented May 19, 1970

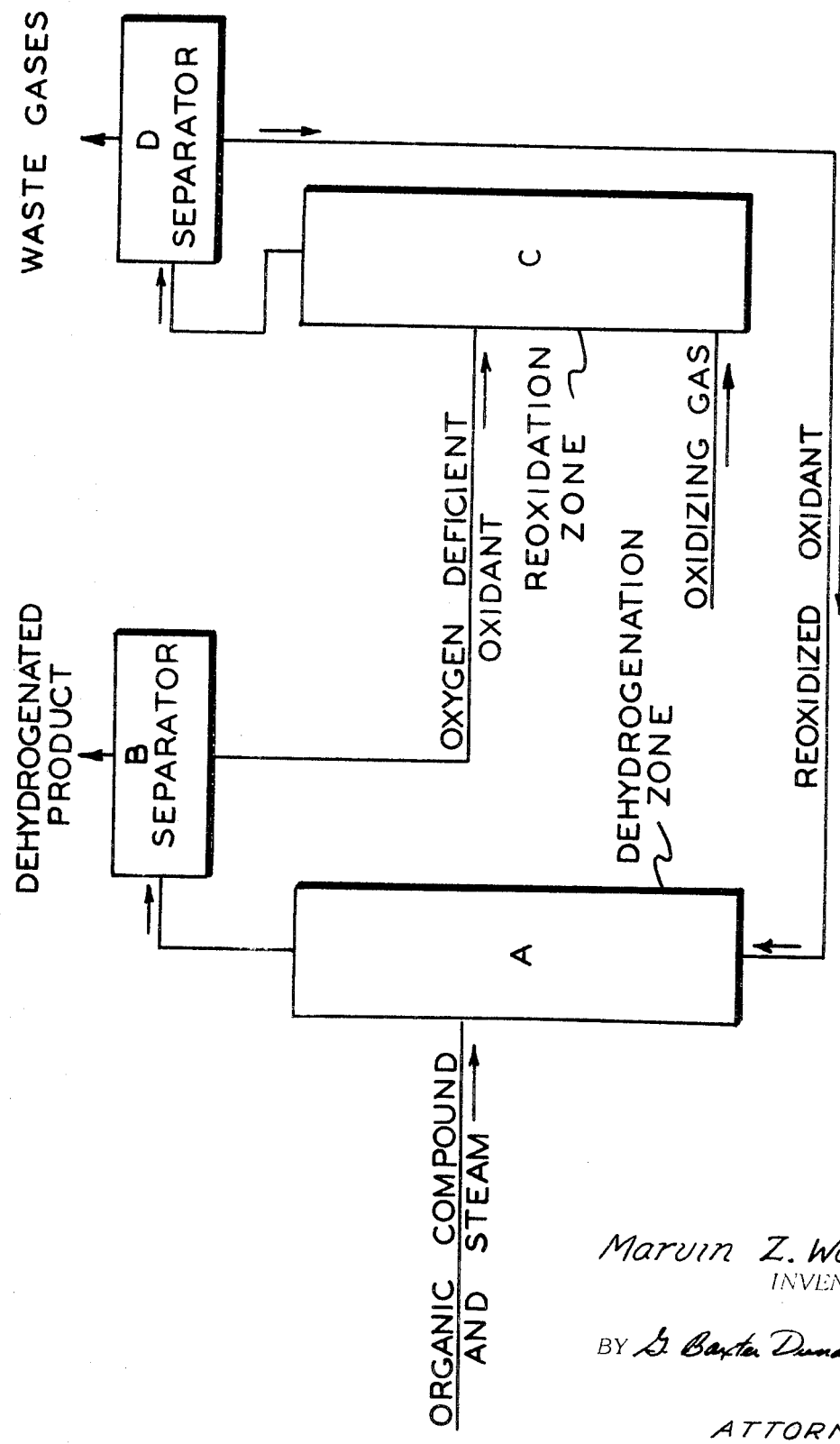

3,513,216
DEHYDROGENATION PROCESS
Marvin Z. Woskow, Houston, Tex., assignor to Petro-Tex Chemical Corporation, Houston, Tex., a corporation of Delaware
Filed Mar. 28, 1968, Ser. No. 716,874
Int. Cl. C07c 5/18, 11/16, 11/18
U.S. Cl. 260—680                                            25 Claims

ABSTRACT OF THE DISCLOSURE

Dehydrogenation of organic compounds by reacting hydrogen removed from the organic compound with oxygen to form water. Oxygen is supplied by a solid oxidant comprising a ferrite of magnesium, manganese, cobalt, nickel, zinc, cadmium and mixtures with boron which releases oxygen and is thereby converted to a composition diminished in oxygen.

BACKGROUND OF THE INVENTION

Field of the invention

This application relates to the dehydrogenation of organic compounds utilizing oxygen released from an oxidant. The invention is particularly suitable for the dehydrogenation of organic compounds such as paraffins, olefins, cycloaliphatics, alkyl aromatic compounds and so forth. Preferred products are such as olefins or diolefins and mixtures thereof.

Description of the prior art

It is known to hydrogenate organic compounds by reacting hydrogen split off from the organic compound with oxygen to form water. One of the principal objections to this type of reaction is that quite often the reaction is unselective and oxygenated compounds are formed instead of the desired dehydrogenated compounds. Attempts have been made to minimize the oxidation of the organic compounds by supplying the oxygen in the form of an oxidant. The oxidant may be such as a metal oxide. At the elevated temperature of reaction and in the presence of the compound to be dehydrogenated, the oxidant releases oxygen which reacts with hydrogen split off from the organic compound. The oxidant is then in a depleted state of oxidation and must be reoxidized in order to further react with the organic compound to be dehydrogenated. Examples of this type of reaction may be found in A. S. Ramage, Can. Chem. J. 2, page 192–5 (1918), U.S. Pat. 3,118,007, Jan. 14, 1964, U.S. Pat 3,050,572, Aug. 21, 1962, U.S. Pat. 2,978,522, Apr. 4 1961, and French Pat. 915,501. However, a superior process is desired. One of the principal objectives of this invention is to provide a process wherein the oxidant has a long life and produces dehydrogenated product at a high level of conversion and selectivity. Other objectives of this process are to provide a process which has an oxidant that is compatible with substantial quantities of steam, a low load on the purification and recovery system, a high overall throughput and low contact time in the dehydrogenation zone, a tolerance for organic impurities in the feed, a simplified dehydrogenation zone, an oxidant and process conditions wherein the oxidant is not easily disintegrated, a low overall requirement for steam, a low maximum temperature during dehydrogenation and an oxidant which is useful for the dehydrogenation of more than one type of organic compound. Still other objectives are to provide a process which can require little or no stripping of reaction gases in the reoxidation zone and a process which has excellent control of reaction temperature.

The choice of oxidant and the method in which it is employed is critical in such a process. The complexity involved in the selection of the oxidant may be comprehended to some extent when the requirements of the oxidant are realized. For selective reaction to take place, the oxidant must release exactly the right quantity of oxygen in the dehydrogenation zone within the proper period of time. If excess oxygen is released, the non-selective oxidation reactions result, whereas if insufficient oxygen is released, the degree of dehydrogenation is retarded. Furthermore, the oxidant must be capable of being repeatedly regenerated quickly and cleanly. Little or no coke formation is desirable. A further objective is that after the oxidant has been used, it should be easily stripped of the adsorbed gases. A most important requirement of the oxidant is that it must exhibit long life, and the ability to achieve selective dehydrogenation and regeneration in sequence must diminish little with time. The exact nature of the acquistion and release of oxygen by the oxidant is not fully understood. Undoubtedly, both physical and chemical phenomena are involved. For example, the oxygen may be both physically adsorbed and chemically reacted to form a compound of a higher state of oxidation. These and other objects of this invention are accomplished according to the process of this invention.

A fixed bed process for dehydrogenation using a catalyst of bismuth, molybdenum and optionally phosphorus, promoted by oxides of boron and bismuth is disclosed in U.S. Pat. 3,320,330.

SUMMARY OF THE INVENTION

According to this invention organic compounds are dehydrogenated by an improved process wherein hydrogen from the organic compound is reacted with oxygen supplied by an oxidant. The oxidant is thereafter reoxidized and again used for the purpose of supplying oxygen to the dehydrogenation zone. According to this invention, the oxidant comprises boron and a ferrite of a member selected from the group consisting of magnesium, manganese, cobalt, nickel, zinc, cadmium or mixtures thereof. An embodiment of the invention is the process wherein the oxidant also comprises iron oxide. A preferred feature of this invention is that the oxidant is formed by having iron which is present as iron oxide in the final oxidant present during the formation of the ferrite. Another preferred feature of this invention is in the use of certain reaction conditions and steps, including a short contact time. An additional feature is in the use of certain quantities of steam in the dehydrogenation zone. Other objects are set forth above.

BRIEF DESCRIPTION OF THE DRAWING

One preferred method of conducting the process of this invention is illustrated in the drawing. The zones are used to illustrate steps of the process. In the dehydrogenation zone A the organic compound to be dehydrogenated is contacted with the oxidant at an elevated temperature. A preferred embodiment is that steam may be also introduced in zone A. The oxidant may suitably be in the form of a moving fluidized bed. The oxidant may then be conducted to the separator B where the oxidant is separated from the dehydrogenated product. The oxidant may then be conducted to reoxidation zone C where the oxidant is reoxidized by an oxidizing gas. The oxidizing gas serves to replenish the oxygen lost during the dehydrogenation in zone A. The reoxidized oxidant may be transmitted to zone D wherein the waste gases are removed. These waste gases may include such gases as nitrogen and combustion products. The oxidant which has been reoxidized and stripped of waste gases may then be recycled to the dehydrogenation zone A to again supply the required quantity of oxygen in the dehydrogenation zone A.

DESCRIPTION OF THE PREFERRED EMBODIMENT(S)

According to this invention a process is provided for the dehydrogenation of organic compounds which comprises (1) contacting in a dehydrogenation step the said organic compound in gaseous form with an oxidant at an elevated temperature with the said oxidant supplying oxygen in the dehydrogenation step to react with hydrogen from the said organic compound and thereby produce dehydrogenated organic compound and oxidant which is diminished in oxygen, (2) separating the dehydrogenated organic compound from the oxidant which is diminished in oxygen, (3) reoxidizing the oxidant and (4) contacting organic compound to be dehydrogenated with the reoxidized oxidant. The oxidant comprises boron and a ferrite of a member selected from the group consisting of magnesium, manganese, cobalt, nickel, zinc, cadmium or mixtures thereof. For convenience this group of metals will hereafter be referred to as the designated metals or as Me. Especially preferred are manganese, zinc and magnesium ferrites.

The process of this invention is a process wherein the oxidant selectively releases the required critical quantity of oxygen in a first step, and the oxidant is regenerated with oxygen in a second step. The regenerated oxidant may then be employed to further contact organic compound as in the first step. Although any method which accomplishes these results may be employed, certain methods are preferred. A preferred process is where the oxidant is in a dilute phase fluidized state as a moving bed and that two separate zones are utilized for dehydrogenation and for reoxidation. By such a procedure the process can be operated continuously. The dehydrogenation zone may be one vessel and the reoxidation zone a separate vessel, or the reoxidation zone and the dehydrogenation zone may be a continuation of each other, as the oxidant may be circulated in a loop with the oxygen being added at one point which is the beginning of the reoxidation zone and the organic compound to be dehydrogenated is added at a later point which becomes the dehydrogenation zone. A preferred mode of operating the invention is illustrated in the drawing wherein separate dehydrogenation and reoxidation zones are employed. However, the zones B and D may be combined with or may be continuations of the respective zones A and C. Stripping gases may be used in zone C, with steam being advantageously employed. Other stripping gases can be substantially inert gases such as nitrogen. However, it is an advantage of the use of the oxidant of this invention that little or no stripping is required in zone C. For example, steam if employed may be used in an amount of less than 5 mols per mol of organic compound to be dehydrogenated fed to the dehydrogenation zone, with a suitable range being from 0 or .5 to 4 mols of steam per mol of organic compound.

According to this invention, it has been discovered that excellent results have been obtained when the iron in the oxidant is not essentially completely in the form of a ferrite. An oxidant having a portion of the iron in the form of iron oxide may be formed by preforming the ferrite and mixing the ferrite with iron oxide. However, we have discovered that superior results are obtained when iron present as iron oxide in the oxidant is either predominately present initially during the formation of the ferrite portion of the oxidant or is predominately formed in situ during the formation of the ferrite or a combination thereof. Thus, according to this mode of the invention, the iron which is present as iron oxide in the oxidant is predominately present during the formation of the ferrite. For example, either iron oxide or a precursor of iron oxide can be combined such as by intimate mixing with the compounds which are the precursors of the ferrite. If iron which is combined with oxygen in the final oxidant is present initially as iron oxide, then the iron oxide may or may not be transformed during the ferrite formation. On the other hand, a precursor of iron oxide such as iron oxalate may be decomposed during the formation of the ferrite to form iron oxide in the final oxidant. Another process wherein the iron of the iron oxide precursor is present during formation of the ferrite is where an excess of ferrite is formed and iron oxide is then formed by reducing the ferrite with a gas such as hydrogen. Nevertheless, even if iron oxide of the oxidant was also initially present as iron oxide, this is not to say that there is no physical or chemical transformation of this initially present iron oxide during the ferrite formation. Any interactions taking place between the initially present iron oxide and the precursors of the ferrite are not fully understood, but superior oxidants may be produced by the procedure. It is possible that the iron oxide or a precursor thereof becomes linked in a crystalline manner with the ferrite which is formed or it is also possible that the iron oxide may be present in the final oxidant as a solution in the ferrite (or vice versa). The oxidant as used in the dehydrogenation step in this invention will preferably have the iron oxide portion of the oxidant predominantly present as gamma iron oxide. This gamma iron oxide may be obtained by forming an oxidant with the iron oxide portion in the form of alpha iron oxide which is thereafter converted to predominantly gamma iron oxide by any suitable means. Nevertheless, it is not essential that the iron oxide first go through the alpha form.

The oxidant as it is being used to supply oxygen in the dehydrogenation zone should preferably have the iron with a valence of predominantly plus three. Also, the ferrite portion of the oxidant should preferably have essentially the formula $MeFe_2O_4$ with Me representing magnesium, manganese, cobalt, nickel, zinc, cadmium or combinations thereof. It has also been discovered that there are certain other characteristics of these preferred oxidants, some of which are discussed below. The surface of the oxidant will preferably have a crystalline structure in which the components have a cubic face-centered configuration as the crystalline structure. Excellent results have been obtained when the oxidant has in the surface from 10 to 98 atomic weight percent of the iron present as ferrite and from 90 to 2 atomic weight percent of the iron being present as iron oxide, with a preferred range being from 40 to 95 atomic weight percent as ferrite and 60 to 5 percent present as iron oxide. The designated metal in the oxidant surface generally will be present in an amount of from or about .2 to 2.0 atoms of Me per atom of iron with a preferred range being from .25 to 1.0 atom with excellent results being obtained at a ratio of about 0.5 atom of Me per atom of iron.

According to this invention it has been found that the preferred oxidants exhibit a certain type of X-ray diffraction pattern. The preferred oxidants do not have as sharp X-ray diffraction reflection peaks as would be found, e.g., in a high crystalline material having the same chemical composition. Instead, the preferred oxidants of this invention exhibit reflection peaks which are relatively broad. The degree of sharpness of the reflection peak may be measured by the reflection peak bandwidth at half height ($W/2$). In other words, the width of the reflection peak as measured at one-half of the distance to the top of the peak is the "bandwidth at half height." The bandwidth at half height is measured in units of ° 2 theta. Techniques for measuring the bandwidths are discussed, e.g., in chapter 9 of Klug and Alexander, X-ray Diffraction Procedures, John Wiley & Sons, N.Y., 1954. The observed bandwidths at half height of the preferred oxidants of this invention are at least 0.16 ° 2 theta and normally will be at least 0.20 ° 2 theta.[1] For instance, excellent oxidants have been made with bandwidths at half height of at least 0.22 or 0.23 ° 2 theta. The particular reflection peak used to measure the bandwidth at one-half height is the reflection peak having Miller ($hkl$) indices of 220. (See, e.g., chapter of Klug and Alexander, ibid.) Applicant does not wish to be limited to any theory of the invention in regard to the relationship between oxidant activity and bandwidth.

Suitable preferred ferrites to be modified with boron according to this invention are zinc ferrites having X-ray diffraction peaks within the d-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52, with the most intense peak being between 2.95 to 3.01; manganese ferrite having peaks at d-spacings within or about 4.87 to 4.93, 2.97 to 3.03, 2.50 to 2.58, 2.09 to 2.15, 1.70 to 1.76, 1.61 to 1.67 and 1.47 to 1.53 (with other peaks), with the most intense peak being between 2.52 to 2.58; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50 with the most intense peak being between 2.49 and 2.55; and nickel ferrites having peaks within the d-spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The zinc ferrites will generally have peaks within the d-spacings 4.84 to 4.88, 2.96 to 3.00, 2.52 to 2.56, 2.41 to 2.45, 2.09 to 2.13, 1.70 to 1.74, 1.60 to 1.64 and 1.47 to 1.51. Similarly, the magnesium ferrites will generally have peaks within the d-spacings of 4.81 to 4.85, 2.93 to 2.98, 2.50 to 2.54, 2.07 to 2.11, 1.69 to 1.72, 1.59 to 1.62 and 1.46 to 1.49, with the most intense peak being within the range of 2.50 to 2.54. The nickel ferrites will generally have peaks within the d-spacings 4.80 to 4.84, 2.93 to 2.97, 2.50 to 2.53, 2.07 to 2.10, 1.59 to 1.61 and 1.46 to 1.49, with the most intense peaks being within 2.50 to 2.53.

Ferrite formation may be accomplished by reacting an active compound of iron with an active compound of the designated metal. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite. Desired ferrites may be obtained by conducting the reaction to form the ferrite at relatively low temperatures, that is, at temperatures lower than some of the very high temperatures used for the formation of some of the semi-conductor applications. Good results, e.g., have been obtained by heating the ingredients to a temperature high enough to produce the required ferrite but at conditions no more severe than equivalent to heating at 950° C. or 1000° C. for 90 minutes in air and generally the maximum temperature will be less than 1300° C. and preferably less than 1150° C.

In the oxidant surface the boron will generally be present in an amount from .002 to 0.3 atom per atom of iron with a preferred range being from .02 to .20 atom per atom of iron. The oxidant also comprises oxygen but the ratio of oxygen to the remaining atoms is variable and may be dependent upon the ambient atmosphere and temperature and what step of the process is involved. The ratio of oxygen to iron will generally be within the range of about 0.5 to 10 or more atoms of oxygen per atom of iron.

The oxidants of this invention may also comprise additives. Phosphorus, silicon or mixtures thereof are examples of additives. Excellent results are obtained with phosphorus and/or silicon present in an amount of from or about 0.2 to 20 weight percent, based on the total weight of the atoms of iron and the designated metal. These ingredients may contribute, e.g., to the stability of the oxidants, and there is some indication of synergistic results being obtained with the boron. Excellent oxidants may contain less than 5 weight percent, and preferably less than 2 weight percent, of sodium or potassium in the surface of the oxidant. Other additives may be present. Also unreacted precursors may be present.

The boron, silicon, phosphorus, or other additives may be added at various stages of the oxidant preparation. The boron may be added in a variety of ways such as by the use of a solution, dispersion or suspension of a boron compound. One preferred method is to mix the dry ingredients including the preformed ferrite, other than the boron, with a boron compound such as boric acid. The boron may also be incorporated during ferrite formation. Any suitable boron compound may be employed such as $B_2O_3$, $H_3BO_3$, $H_2B_4O_7$, BP, ammonium tetraborate and the like. If phosphorus or silicon is employed, there may be added such as by the use of any of the phosphoric acids, phosphorus pentoxide, ethyl phosphate, amine phosphate, ammonium phosphate, phosphorus halides, phosphorus oxyhalides, silicon halides and so forth. Silica may be incorporated in the oxidant, for example, by the acid hydrolysis of an organic or inorganic silicate, such as tetraethyl ortho silicate. The boron should suitably be present in an intimate combination with the other ingredients of the oxidant. These additives may or may not be combined chemically, intimately mixed, in solid solution with the other ingredients, and so forth.

The quantity of oxidant present during dehydrogenation will vary depending upon the type of process employed, the particular composition of the oxidant, whether carriers or supports are used, and so forth. With a moving bed the oxidant will generally be at least 10 parts per part by weight of the organic compound to be dehydrogenated and suitable ranges may be such as from 10 to 1500 parts of oxidant per part of organic compound to be dehydrogenated. Fresh oxidant may be added at any stage of the process including the addition during operation.

Carriers or supports for the oxidant may be employed such as alumina, pumice, silica and so forth. Diluents and binders may also be used. The oxidant will suitably be fine grained and the particle size of the oxidant may vary but for moving beds particle sizes of less than 1000 microns have given good results. Unless stated otherwise, the referred to compositions of the oxidants in this application are the main active constituents of the oxidants during dehydrogenation and any ratios and percentages refer to the surface of the oxidant in contact with the gaseous phase during dehydrogenation.

The oxidant may be activated or regenerated by reducing with a reducing gas, e.g., such as hydrogen or hydrocarbons. For example, the preformed oxidant may be reduced with, e.g., hydrogen at a temperature of at least 350° C. with the temperature of reduction generally being no greater than 850° C. The period of time for reduction will be dependent somewhat upon the temperature of reduction but ordinarily will be at least 30 minutes.

[1] The powder diffraction patterns may be made, e.g., with a Norelco constant potential diffraction unit type No. 12215/0 equipped with a wide range goniometer type No. 42273/0, cobalet tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving .006 inch and scatter 1°. Strip chart recordings for identification are made with a scanning speed of 1/4° per minute, time constant of 4 seconds and a full scale at $10^3$ counts per second. No correction is made for $K^α$ doublet or instrumental broadening of the bandwidths.

By reducing gas is meant a gas that will react with oxygen of the oxidant under the conditions of reduction.

When employing the oxidant in this process excellent results have been obtained. For example, the oxidant exhibits relatively little time trend compared to other compositions. Further it has been found that the oxidant has desirable adsorption characteristics in regard to both oxygen, organic compounds and inert gases. The oxidant selectively releases oxygen during dehydrogenation and is readily reoxidized during reoxidation. There is relatively limited carry-over of dehydrogenated organic compound on the oxidant after separation of the oxidant from the dehydrogenated gases and as a consequence, the use of a separate stripping step may, if desired, be eliminated and comparatively little or no stripping gas needs to be employed during reoxidation. The oxidant results in dehydrogenations at high selectivity and yield. Moreover, the oxidant is not sensitive to steam and steam may be advantageously employed during dehydrogenation such as in an amount of at least 2 mols per mol of organic compound to be dehydrogenated. A further advantage of the oxidant is that it is resistant to attrition and physical or chemical disintegration.

The process of this invention may be applied to the dehydrogenation of a wide variety of organic compounds. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulphur. Preferred are compounds having from 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2 chlorobutene-1 or 2,3 dichlorobutane to chloroprene, ethyl pyridine to vinyl pyridine, ethylbenzene to styrene, isopropylbenzene to α-methyl styrene, ethylcyclohexane to styrene, cyclohexane to benzene, methane to ethylene and acetylene, ethane to ethylene to acetylene, propane to propylene or methyl acetylene, allene, or benzene, isobutane to isobutylene, n-butane to butene and butadiene-1,3, butene to butadiene-1,3 and vinyl acetylene, methyl butene to isoprene, cyclopentane to cyclopentene and cyclopentadiene-1,3, n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an ayclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3 dichlorobutane, 1,4 dichlorobutane, the chlorofluoroethanes, methyl pentane, methylethyl ketone, diethyl ketone, n-butyl alcohol, methyl propionate, and the like.

Suitable dehydrogenation reactions are the following: acyclic compounds having 4 to 5 nonquarternary contiguous carbon atoms to the corresponding olefins, diolefins or acetylenes having the same number of carbon atoms; aliphatic hydrocarbons having 6 to 16 carbon atoms and at least one quarternary carbon atom to aromatic compounds, such as 2,4,4-trimethylpentene-1 to a mixture of xylenes; acyclic compounds having 6 to 16 carbon atoms and no quaternary carbon atoms to aromatic compounds such as n-hexane or the n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene. The process of this invention can provide a product wherein the principal product has the same number of carbon atoms as the corresponding feed.

The preferred compounds to be dehydrogenated are hydrocarbons with a particularly preferred class being acyclic nonquarternary hydrocarbons having 4 to 5 contiguous carbon atoms or ethyl benzene and the preferred products are n-butene-1 or 2, butadiene-1,3, vinyl acetylene, 2 methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

Diluents or stripping agents such as nitrogen, helium, or other gases may be fed to the process at any point. Mixtures of diluents may be employed. Volatile compounds which are not dehydrogenated or which are dehydrogenated only to a limited extent may be present as diluents.

It is one of the advantages of this process that during dehydrogenation the reaction mixture may contain steam. When steam is employed during dehydrogenation, the range will generally be between about 1 and 40 mols of steam per mol of organic compound to be dehydrogenated. Preferably, steam will be present in an amount from about 2 to 30 mols per mol of organic compound to be dehydrogenated and excellent results have been obtained within the range of about 3 to about 25 mols of steam per mol of organic compound to be dehydrogenated. The functions of the steam are several-fold, and the steam may act as more than a diluent. Diluents generally may be used in the same quantities as specified for the steam. Excellent results are obtained when the composition present in the reactor during dehydrogenation consists essentially of the organic compound to be dehydrogenated, diluents, and the oxidant as essentially the sole oxidizing agent.

The amount of oxygen supplied to the overall process may vary depending upon the desired result such as conversion, selectivity and the number of hydrogen atoms being removed. Thus, to dehydrogenate butane to butene requires less oxygen than if the reaction proceeds to produce butadiene. Normally, free oxygen will be present in the dehydrogenation zone in an amount from about 0.2 to 1.5, preferably 0.3 to 1.2, mols per mol of $H_2$ being liberated from the organic compound. Ordinarily, the mols of free oxygen in the dehydrogenation zone will be in the range of from .2 to 2.0 mols per mol of organic compound to be dehydrogenated and for most dehydrogenations this will be within the range of .25 to 1.5 mols of oxygen per mol of organic compound. Although determinations regarding the mechanism of reaction are difficult, the process of this invention is an oxidative dehydrogenation process wherein the predominant mechanism of dehydrogenation is by the reaction of oxygen with hydrogen and preferably at least 85 or 90 mol percent of the hydrogen atoms removed are by this reaction.

It is one of the advantages of this invention that halogen may also be present in the reaction gases to give excellent results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; metal halides including molten halides; and the like. The halogen may be liberated partially or entirely by a solid source as disclosed in the process of U.S. 3,130,241 issued Apr. 21, 1964. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is up to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 700° C. or 800° C. or perhaps higher such as 900° C. under certain circumstances. However, excellent results are obtained within the range of or about 350° C. to 700° C., such as from or about 400° C. to or about 675° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat do not have to be added to the reaction.

The total pressure during dehydrogenation may be atmospheric, superatmospheric or subatmospheric. However, relatively low total pressures are entirely suitable, such as equal to or less than 100 p.s.i.g. When the total pressure of the reaction gases during dehydrogenation is one atmosphere or greater, the partial pressure of the organic compound to be dehydrogenated during dehydrogenation will desirably be no greater than one-third of the total pressure.

The contact time of the organic compound during dehydrogenation may be varied depending upon the particular process employed. However, we have discovered and it is an advantage of the invention that short contact times may be utilized such as less than 2 seconds and suitably less than one second such as from .005 to 0.9 second. For this definition the contact time is defined as the period beginning when the organic compound being dehydrogenated is first contacted with the oxidant in the dehydrogenation step and ending when separation of the gaseous reactants containing the dehydrogenated compound is initiated. Therefore, if a separator such as zone B of the drawing is employed, the period of time in the separator is not included in calculating contact time. Generally the flow rates will be within the range of about 0.10 to 25 liquid volumes of the organic compound to be dehydrogenated per volume of dehydrogenation zone containing catalyst per hour (referred to as LHSV). Usually, the LHSV will be between 0.15 and about 5 or 10.

The reoxidation of the oxidant is accomplished by contacting the oxidant with an oxidizing gas at an elevated temperature. By an oxidizing gas is meant any gaseous composition that will supply oxygen to the oxidant under the conditions of reoxidation. Air, oxygen, steam and mixtures thereof, with or without diluents, and so forth, may be employed. Generally the amount of oxygen, from any source, supplied during reoxidation will be from .1 to 1.2 or 1.5 mols per mol of $H_2$ removed during the dehydrogenation step. As mentioned above, it is one advantage of this invention that there is relatively little gas to be stripped from the oxidant after the reaction gases have been separated from the oxidant. Consequently, good stripping has been obtained with, e.g., 5 or less mols of stripping gas such as steam per mol of organic compound to be dehydrogenated and in some instances the stripping step may be eliminated. At any rate, it is possible to conduct any stripping during the reoxidation step without conducting a separate stripping step. The reoxidation can be conducted, e.g., at temperatures within the same ranges recited for the dehydrogenation step but somewhat higher temperatures may be employed in some instances. Good results have been obtained at contact times of less than 10 seconds, preferably less than 5 seconds. Pressures of less than 100 p.s.i.g. are generally employed.

In the following examples will be found specific embodiments of the invention and details employed in the practice of the invention. Percent conversion refers to the mols of organic compound to be dehydrogenated that is consumed, based on the mols of the said organic compound fed to the reactor, percent selectivity refers to the mols of product formed based on the mols of the said organic compound consumed, and percent yield refers to the mols of product formed based on the mols of the said organic compound fed. All other percentages are by weight unless expressed otherwise.

EXAMPLE 1

To illustrate an example of a preferred method of conducting the invention, reference is again made to the drawing. The invention is illustrated by the dehydrogenation of n-butene to butadiene-1,3. The reactor is constructed of 316 stainless steel with dehydrogenation zone A being a dilute phase riser reactor which is 40 inches long and is 5/8 inch O.D. tubing. In this example, butene, oxidant and steam are fed to the bottom of the riser reactor zone A through a 1/4 inch O.D. tube. This riser zone A discharges into a 6-inch diameter disengaging separator which is zone B of the drawing wherein the gaseous dehydrogenated product is separated by passing through a pair of micrometallic filters which are alternately on stream or being cleaned by nitrogen blowback. The oxidant which is diminished in oxygen content in the dehydrogenation zone A and which has been separated from the gaseous product in separator zone B then falls into a standpipe, not illustrated in the drawing. The standpipe is 30 inches long and is standard 1½ inch diameter I.D. stainless steel pipe. From the standpipe the oxidant is conducted through a reoxidation zone which is illustrated as zone C of the drawing. The reoxidation zone is 5/8 inch O.D. tubing 40 inches long with air and steam being fed through a 1/4-inch tube into the bottom of the reoxidation zone. The air and steam serve to convey the oxidant through the reoxidation zone as well as to reoxidize the oxidant. The reoxidized oxidant discharges into separator zone D of the drawing. The separator is a 6-inch diameter section where the waste gases such as nitrogen and combustion gases are taken off through two micrometallic filters. The reoxidized oxidant drops by gravity into a standpipe, not shown in the drawing. This standpipe is 30 inches long and is constructed of 1½-inch O.D. stainless steel pipe. The cycle is completed by allowing the reoxidized oxidant to be fed by gravity through a narrow neck into the entrance to the riser reactor dehydrogenation zone A described above where it contacts fresh butene, oxidant and steam. The contact time in dehydrogenation zone A is about 0.1 second and the contact time in reoxidation zone B is about 0.1 second. Temperatures are measured by thermocouple and the maximum temperature in the dehydrogenation zone A is 550° C. and the maximum temperature in the reoxidation zone is 550° C. The feed to dehydrogenation zone A consists of a hydrocarbon mixture containing by mol percent 98 percent n-butenes-2, 1.0 percent n-butene-1, 0.5 percent n-butane and 0.5 percent butadiene. Steam is fed to dehydrogenation zone A in an amount of 4.1 mols per mol of the total hydrocarbon feed. Oxygen is supplied as air in an amount equivalent to 0.65 mol oxygen per mol of hydrocarbon feed. The reoxidized oxidant is fed to dehydrogenation zone A in an amount of 200 parts by weight per weight of hydrocarbon. The oxidant employed comprises particles of 40 to 100 mesh size (Tyler screen) magnesium ferrite modified with approximately 10 weight percent of $H_3BO_3$ (added as an aqueous solution containing 10 percent by weight $H_3BO_3$). The oxidant is prepared by intimately mixing 915 parts by weight of alpha iron oxide $Fe_2O_3 \cdot H_2O$ and 455 parts by weight of magnesium carbonate with 10.2 parts by weight of $MgCl_2 \cdot 6H_2O$. The mixture is then dried and then reacted to form ferrite for about 15 minutes in an air atmosphere in a reactor having a maximum temperature of about 850° C. After heating the oxidant is milled to a fine powder and then is blended with water and 100 parts by weight of $H_3BO_3$ and dried to dryness at 120° C. The dried powder is then sieved to separate out a 40–100 mesh powder which is used as the oxidant. The oxidant so produced is employed according to the procedure described above and at a temperature as measured in zone A of 993° F.

EXAMPLE 2

Example 1 is repeated with the exception that the magnesium ferrite is Columbium Carbon Company type EG–1 modified with 10 percent $H_3BO_3$ by weight (added as a 10 percent concentration $H_3BO_3$ aqueous solution). At a temperature in Zone A of about 990° F. the conversion of butenes was 68 percent at a selectivity of 95 mol percent for a yield of 64.5 mol percent butadiene per pass.

EXAMPLE 3

Example 2 is repeated with the noted exceptions. 2-methylbutene-2 is dehydrogenated to isoprene and in this case, steam is fed to the dehydrogenation zone A in an amount of 7.8 mols per mol of the total hydrocarbon feed and oxygen is supplied as air in an amount equivalent to 0.6 mol oxygen per mol of hydrocarbon feed. The temperature in zone A is 943° F. After 500 hours of operation, the 2-methylbutene-2 is converted at a rate of 54.3 mol percent at a selectivity to isoprene of 91.8 mol percent for a yield of 49.8 mol percent isoprene per pass.

EXAMPLE 4

Example 2 is repeated with the exception that boric acid is omitted. The temperature in zone A is 910–940° F. After 120 hours of operation, the butenes are converted at a rate of 46.4 mol percent at a selectivity to butadiene-1,3 vof 86.5 mol percent for a yield of 40 mol percent butadiene-1,3 per pass.

EXAMPLE 5

Example 2 is repeated with the noted exceptions. 50 parts of $H_3PO_4$ is used instead of 100 parts of $H_3BO_3$. After 50 hours of operation with steam being fed to dehydrogenation zone A in an amount of 9.3 mols per mol of the total hydrocarbon feed and oxygen being supplied as air in an amount to .97 mol oxygen per mol of hydrocarbon feed and at a temperature of 1059° F. in dehydrogenation zone A, the butenes are converted at a rate of 53.3 mol percent at a selectivity to butadiene-1,3 of 91.8 mol percent for a yield of 49 mol percent butadiene-1,3 per pass.

EXAMPLE 6

A mixture of aproximately 60 mol percent butene-1 and 40 mol percent n-butane is dehydrogenated according to the procedure of Example 1 with the noted exceptions. Chlorine and bromine are fed to the dehydrogenation zone in an amount equivalent to .015 and .010 mol respectively (fed as an aqueous solution of the acids). The oxidant employed comprises particles of 40 to 60 mesh size (Tyler screen) cobalt ferrite and iron oxide with approximately 9 weight percent of the surface of fresh oxidant being analyzed as alpha iron oxide. No carrier or support is used for the oxidant. The oxidant is prepared by intimately mixing 178 parts by weight of alpha iron oxide $Fe_2O_3 \cdot H_2O$ per 114 parts by weight of cobaltous carbonate with 3.3 percent by weight of $CoCl_2 \cdot 6H_2O$ and 1.0 percent by weight $B_2O_3$ both based on the total weight of $Fe_2O_3 \cdot H_2O$ and cobaltous carbonate. The mixture is then heated at 600° C. for a period of time selected to cause the formation of the oxidant having 9 percent by weight of alpha iron oxide. After heating the oxidant is screened to select the 40 to 60 mesh size used.

EXAMPLE 7

The procedure of Example 1 is repeated with the exception that the oxidant comprises nickel ferrite and iron oxide. The oxidant is prepared by intimately mixing 178 parts by weight of alpha iron oxide $Fe_2O_3 \cdot H_2O$ per 118.7 parts by weight of nickelous carbonate with 3.5 percent by weight of $NiCl_2 \cdot 6H_2O$ and 7.5 percent $H_3BO_3$, both based on the total weight of $Fe_2O_3 \cdot H_2O$ and nickelous carbonate. The mixture is then heated at 600° C. for a period of time selected to cause the formation of the oxidant having an excess of alpha iron oxide. After heating the oxidant is screened to select the 40 to 60 mesh size used. The oxidant has the most intense X-ray diffraction peak at about 2.51 d-spacing and also comprises X-ray diffraction peaks at 4.84, 2.95, 2.51, 2.41, 2.09, 1.71, 1.60 and 1.48 with other minor peaks. The bandwidth at half height of the peak at $hkl$ 220 is greater than .30 ° 2 theta.

EXAMPLE 8

Example 1 is repeated with the exception that the oxidant is manganese ferrite modified with boron. The oxidant employed comprises particles of 40 to 100 mesh size (Tyler screen) manganese ferrite and iron oxide with approximately 7 weight percent of the surface of fresh oxidant being analyzed as alpha iron oxide. This analysis is made by X-ray diffraction. The oxidant is supported (30 percent by weight) on Carborundum Company alumina carrier. The oxidant is prepared by intimately mixing 183.6 parts by weight of alpha iron oxide $Fe_2O_3 \cdot H_2O$ per 117.8 parts by weight of manganese carbonate with 4 percent by weight of $MnCl_2$ based on the total weight of $Fe_2O_3 \cdot H_2O$ and manganese carbonate. The mixture is then heated at 600° C. for a period of time selected to cause the formation of the oxidant having 7 percent by weight of alpha iron oxide. A boric acid solution is intimately mixed with the oxidant in an amount of 2.5 percent by weight. The modified oxidant is dried at 120° C. and milled to a fine powder and then coated onto 100 mesh alumina. The oxidant has the most intense X-ray diffraction peak [1] at about 2.56 d-spacing and also comprises X-ray diffraction peaks at about 4.89, 3.00, 21.2, 1.73, 1.64 and 1.50 with other minor peaks. The band width at half height at $hkl$ 220 is greater than 0.19 ° 2 theta.

EXAMPLE 9

Example 1 is repeated with the exception that ethyl benzene is dehydrogenated to styrene.

---

[1] See footnote above for X-ray procedure.

I claim:

1. A process for the dehydrogenation of organic compounds which comprises (1) contacting in a dehydrogenation step the said organic compound in gaseous form with an oxidan at an elevated temperature with the said oxidan supplying oxygen in the dehydrogenation step to react with hydrogen from the said organic compound and thereby produce dehydrogenated organic compound and oxidant which is diminished in oxygen, (2) separating the dehydrogenated organic compound from the oxidant which is diminished in oxygen, (3) reoxidizing the oxidant and (4) contacting organic compound to be dehydrogenated with the reoxidized oxidant, the said oxidant comprising a ferrite of a member selected from the group consisting of magnesium, manganese, cobalt, nickel, zinc, cadmium or mixtures thereof, with the said ferrite being modified with boron.

2. The process of claim 1 wherein the oxidant comprises ferrite and iron oxide with from 10 to 98 atomic weight percent of the iron being present as ferrite and from 90 to 2 atomic weight percent of the iron being present as iron oxide.

3. The process of claim 2 wherein the said iron which is present as iron oxide in the oxidant is predominately present during the formation of the said ferrite.

4. The process of claim 1 wherein the said organic compound is a hydrocarbon.

5. The process of claim 1 wherein the said organic compound is an acyclic hydrocarbon of 4 to 5 nonquaternary carbon atoms.

6. The method of claim 1 wherein the said boron is present in an amount of from .002 to 0.3 atom per atom of iron.

7. The process of claim 1 wherein the said organic compound is selected from the group consisting of n-butene, methyl butene and mixtures thereof.

8. The process of claim 1 wherein the said organic compound is n-butene.

9. The process of claim 1 wherein the said oxidant is introduced into the dehydrogenation zone as a fluidized bed in a higher state of oxidation and thereafter is introduced as a fluidized bed into a reoxidizing zone wherein the oxidant is regenerated by heating it in the presence of an oxidizing gas and returning the resulting oxidized oxidant to the dehydrogenation zone.

10. The process of claim 1 wherein the contact time of the organic compound in the dehydrogenation step is from .005 to 0.9 second.

11. The process of claim 1 wherein at least two mols of steam are added to the dehydrogenation step per mol of said organic compound.

12. The process of claim 1 wherein the bandwidth at half height as measured in units of ° 2 theta is at least 0.16 of the X-ray reflection peak having Miller indices of 220.

13. The process of claim 1 wherein the oxidant has the most intense X-ray diffraction peak within the range of 2.50 to 2.58.

14. The process of claim 1 wherein the said iron of the oxidant is present from 40 to 95 atomic percent as a ferrite and from 60 to 5 atomic weight percent as iron oxide.

15. The process of claim 2 wherein the said iron oxide of the oxidant is predominantly present as gamma iron oxide during the dehydrogenation step.

16. The process of claim 1 wherein the oxidant contains phosphorus in an amount from 0.2 to 20 weight percent phosphorus based on the total weight of the atoms of iron and manganese.

17. The process of claim 1 wherein the manganese of the oxidant surface is present in an amount from about 10 to 45 weight percent of the total of iron and the said member selected from the group consisting of magnesium, manganese, cobalt, nickel, zinc, cadmium or mixtures thereof.

18. The process of claim 1 wherein in the dehydrogenation zone the temperature is from 425° C. to 650° C. and the total pressure is less than 100 p.s.i.g. and in the regeneration zone the temperature is no greater than 750° C.

19. The process of claim 1 wherein the said oxidant has been prepared by heating under conditions no more severe than equivalent to heating at 950° C. for 90 minutes in the presence of air.

20. The process of claim 1 wherein there is substantially no steam added during the reoxidation of the oxidant.

21. The process of claim 1 wherein the ferrite is magnesium ferrite.

22. The process of claim 1 wherein halogen is present in the dehydrogenation step.

23. The process of claim 1 wherein the iron of the oxidant during dehydrogenation predominately has the valence of plus 3 and is in a cubic face-centered structure.

24. The process of claim 1 wherein the boron is present in an amount of about .02 to .20 atom per atom of iron.

25. A process for the dehydrogenation of a hydrocarbon selected from the group consisting of n-butene, methyl butene and mixtures thereof which comprises contacting in a dehydrogenation zone the hydrocarbon and from 2 to 15 mols of steam per mol of hydrocarbon with a dilute phase moving fluid bed oxidant, with the said oxidant supplying oxygen in the dehydrogenation zone to react with hydrogen from the hydrocarbon and thereby produce dehydrogenated hydrocarbon having the same number of carbon atoms, in the dehydrogenation zone the temperature being from 425° C. to 700° C. and the contact time for the hydrocarbons being less than 2 seconds, separating the dehydrogenated hydrocarbon from the oxidant and passing the oxidant as a moving fluid bed to a reoxidation zone wherein the oxidant is reoxidized by contacting with an oxidizing gas at a temperature of no greater than 750° C. and the reoxidized oxidant is conducted to the said dehydrogenation zone as a dilute phase moving bed to again supply oxygen for dehydrogenating hydrocarbon, the said oxidant as it enters the dehydrogenation zone comprising a ferrite of a metal selected from the group consisting of magnesium, manganese, cobalt, nickel, zinc, cadmium or mixtures thereof and gamma iron oxide with the iron in the oxidant being present from 40 to 95 atomic weight percent as a ferrite and from 60 to 5 atomic weight percent as iron oxide and the said oxidant being modified with boron is an amount from .02 to .20 atom of boron per atom of iron.

References Cited

UNITED STATES PATENTS

| | | | |
|---|---|---|---|
| 3,320,330 | 5/1967 | Callahan et al. | 260—680 |
| 3,420,911 | 1/1969 | Woskow et al. | 260—680 |
| 3,420,912 | 1/1969 | Woskow et al. | 260—680 |

PAUL M. COUGHLAN, Jr., Primary Examiner

U.S. Cl. X.R.

252—432; 260—669, 696